Dec. 29, 1953  E. A. FUGLIE  2,663,889
COMBINATION BRUSH AND SPONGE WINDSHIELD CLEANER
Filed Sept. 29, 1947  3 Sheets-Sheet 1
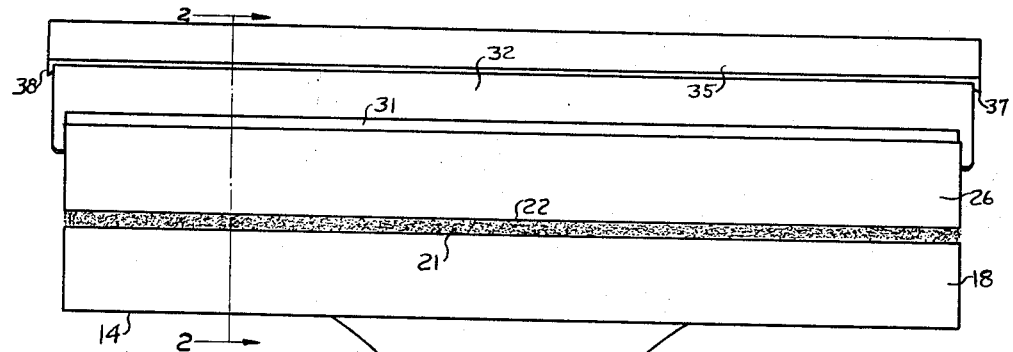
Fig. 1
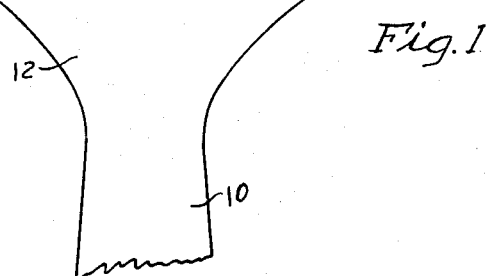
Fig. 2
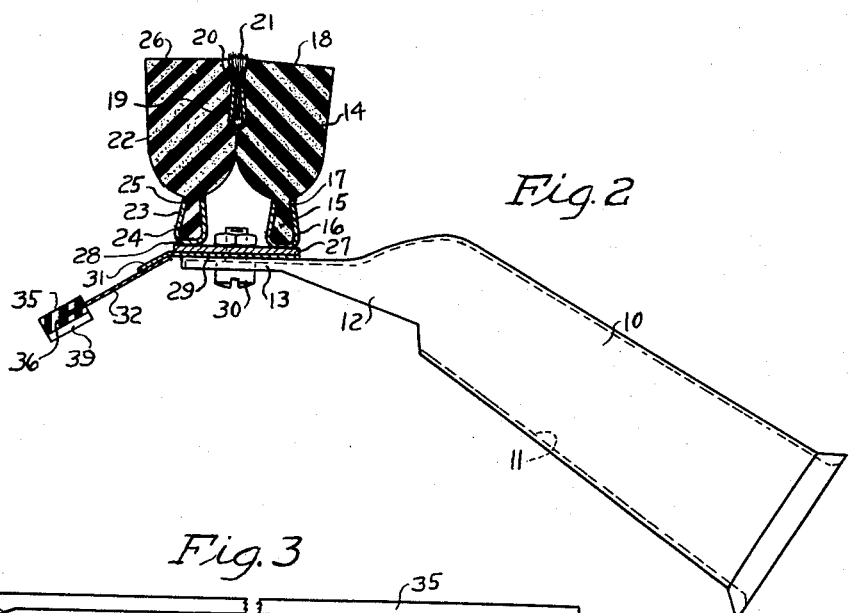
Fig. 3
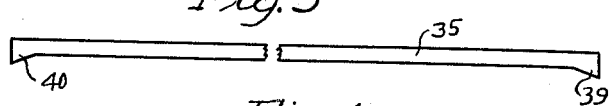
Fig. 4
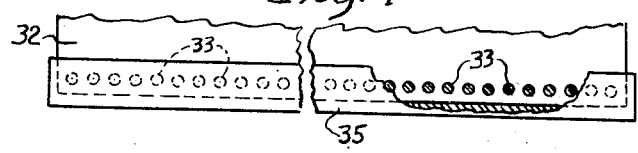
Inventor
ELMER A. FUGLIE
By *[signature]*
Attorney Dec. 29, 1953 E. A. FUGLIE 2,663,889
COMBINATION BRUSH AND SPONGE WINDSHIELD CLEANER
Filed Sept. 29, 1947 3 Sheets-Sheet 2

Inventor
ELMER A. FUGLIE
BY
Attorney

Dec. 29, 1953          E. A. FUGLIE          2,663,889
COMBINATION BRUSH AND SPONGE WINDSHIELD CLEANER
Filed Sept. 29, 1947          3 Sheets-Sheet 3

Inventor
ELMER A. FUGLIE

Patented Dec. 29, 1953

2,663,889

UNITED STATES PATENT OFFICE 2,663,889

COMBINATION BRUSH AND SPONGE WINDSHIELD CLEANER

Elmer A. Fuglie, Winona, Minn., assignor to Winona Tool Manufacturing Company, a partnership Application September 29, 1947, Serial No. 776,832

7 Claims. (Cl. 15—114)

My invention relates to a windshield cleaner, and has for its object to provide in combination a water holding member and a stiff bristle member, whereby water, including such detergent solution as may be desirable, may be wiped over the surface of a windshield or similar surface which it is desirable to clean, while the member is rubbing the windshield surface, and the bristles will engage and act to remove adherent particles from the surface, such as remains of insect bodies, flecks of mud or the like.

In general, the practice of cleaning windshields has been to apply water or a detergent solution to the face of the windshield by means of a sprayer, and then to rub it with a cloth in an endeavor to get the windshield clean. At times, where material will not rub off with the cloth, a razor blade will be used in an attempt to take off such strongly adherent material. Efforts have been made to clean a windshield also by the use of a squeegee against the front of the glass after it has been covered with a layer of water.

But these devices are quite largely ineffective without the consumption of a great deal of time and effort, for the reason that matter such as the insect bodies or the juices thereof becomes very firmly adherent to the windshield and in the old practice have only been removed with much difficulty by the use of a sharp blade, such as a razor blade.

I have discovered that if a water absorbent holder be employed, such as sponge rubber or synthetic sponge rubber, in conjunction with a row of stiff bristles, the water may be applied to the windshield. The rubbing action may take place directly without the use of a separate cloth, and, with the action of the bristles, will remove not only spots and streaks of dust and dirt, but also the strongly adherent material such as bodies of insects and the like at the same time that the water or detergent solution is applied to the surface of the windshield.

I also discovered that after such application a squeegee immediately applied, available in connection with the sponge rubber moistener and scrubber, will be most effective in finishing the cleaning so as to leave a highly polished clean surface to the windshield.

It is a principal object of my invention, therefore, to provide a sponge rubber member held on a handle and secured thereto, with a holder of a narrow set of stiff bristles carried thereby in such a manner that the bristles will extend a short distance outside of the outer surface-contacting face of the sponge rubber member, so that at the same time water may be applied, rubbing contact effected and the bristles in turn may remove strongly adherent matter from the surface being cleaned.

It is a further object of my invention to provide a pair of sponge rubber members and to secure them in side-contacting relation to a carrier and to position the holder of bristles between adjacent sides of said sponge rubber members, with means yieldingly pushing the bristles outwardly.

The full objects and advantages of my invention will appear in connection with the detailed description thereof given in the appended specification and the novel features by which the before mentioned advantageous results are obtained will be particularly pointed out in the claims.

In the drawings showing an application of my invention in one of its forms,

Fig. 1 is a plan view of one form of my invention as viewed toward the surface-engaging portions of the sponge rubber members.

Fig. 2 is a transverse sectional view taken on line 2—2 of Fig. 1.

Fig. 3 is an edge view of the plastic or rubber squeegee member.

Fig. 4 is a top view of the squeegee member shown in Fig. 3 in connection with the spring steel blade secured to the handle to which it is attached, with a part broken away.

Figure 7:
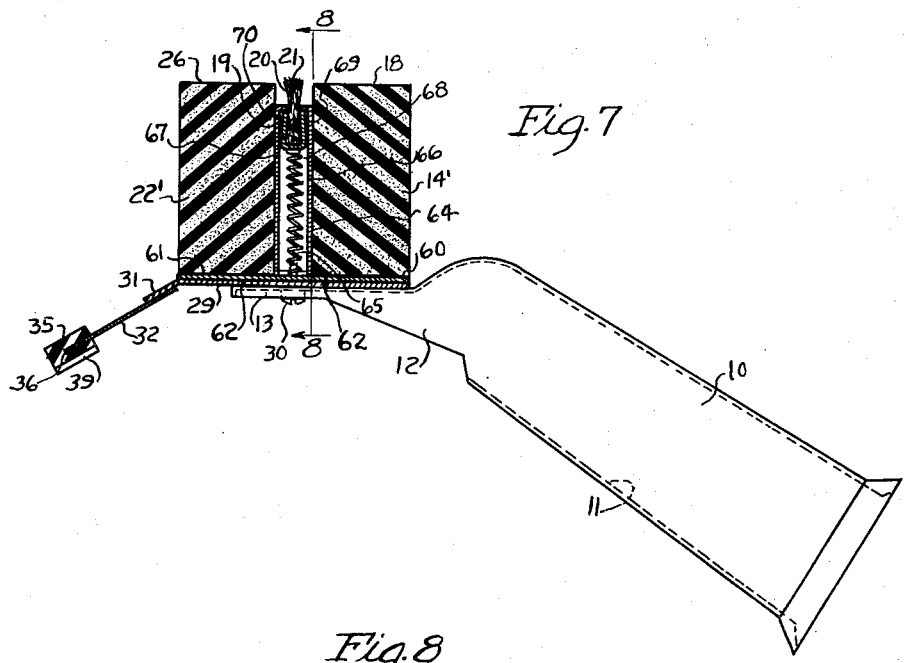
Fig. 7 is a view similar to Fig. 2 of another and sometimes preferred form of my invention.

As shown in Figs. 1, 2 and 7, my device includes a handled member 10, preferably of metal, which, as indicated by dotted lines, is hollow, providing a slightly conical socket 11 for receiving an extension when that is desired. The handle is provided with a reduced portion 12 and a flat base plate 13, which extends outwardly from the handle at a broad angle thereto. The reduced portion 12, as shown in Fig. 1, is expanded laterally to give extended lateral support to the base plate 13.

A water absorbent member 14 is formed preferably of synthetic sponge rubber. This member is normally rectangular in cross-section, as shown in Fig. 7, but, in the form of Figs. 1 and 2, is compressed at 15 to be held by a U-shaped clamping member 16, having its side walls turned toward each other to compress and grip a neck of the sponge rubber material indicated at 17.

In this manner an elongated block of sponge rubber is firmly held by the U member 16. This block is expanded to full width toward its outer end and has a relatively plane-surfaced outer portion, as indicated at 18.

A bristle-carrying clamp 19 is a sort of U-piece, which holds a line of stiff bristles 20 as shown in Figs. 2, 5, 6, 7 and 8, and best shown in Figs. 2 and 7. In the form of Figs. 1 and 2, the U-member 19 will be firmly secured to a side wall of the synthetic sponge rubber member 14 with the bristles extending slightly above the surface 18 as indicated at 21.

While the device will operate effectively with only one water absorbent member 14, a preferred form uses a second absorbent member 22, which, in the form of Figs. 1 and 2, is held by a U piece 23 with a contracted portion 24 and clamped neck 25, in exactly the same manner as has been described for the synthetic sponge rubber member 14.

Likewise, the outer portion of member 22 is expanded to full extent and is provided with a substantially plane-surfaced end 26. In this form, as shown in Fig. 2, the bristle holder 19 is secured to adjacent sides of synthetic sponge rubber members 14 and 22.

I have found that this securing can be done effectively by the use of water-proof glue (not shown in the drawings) directly adhering the outer walls of the clamp 19 to side walls of members 14 and 22. In this form also the bristle extension 21 will extend above the surfaces 18 and 26 of both synthetic sponge rubber liquid absorbers 14 and 22, and when the apparatus is at rest, the surfaces 18 and 26, in the form of Figs. 1 and 2, will extend at a slight angle to each other.

As shown in Fig. 2, the U-members 16 and 23 are permanently attached to a supporting plate 27, preferably by means of soldering as indicated at 28. The plate 27 is positioned over a spring steel plate 29, and both plates are held securely to the base 13 by means of a screw bolt 30 as shown in Fig. 2.

Figure 5:
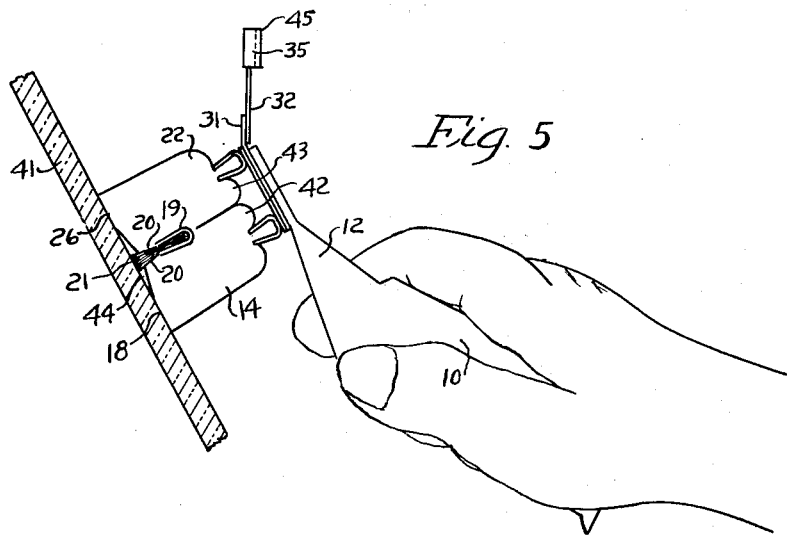
Fig. 5 illustrates in an end view of how the sponge rubber members yield in the form of Fig. 1, to bring the major part of the surfaces of the members against the surface of the windshield with the bristles in effect spring held against said surface.
Figure 8:
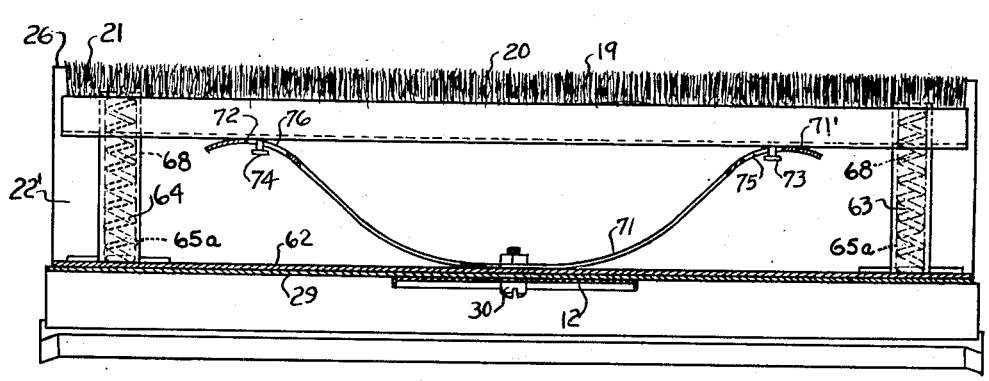
Fig. 8 is a longitudinal sectional elevation view in the position of line 8—8 of Fig. 7 viewed in the direction of the arrows with a different means of projecting the brush holder outwardly from what is shown in Fig. 7.

The form of my device illustrated in Figs. 7 and 8, has some advantages over that shown in Figs. 1, 2 and 5 and although somewhat more expensive to build, may be a preferred form.

In this form of my invention, as clearly shown in Fig. 7, the blocks of synthetic sponge rubber 14' and 22' are secured in their full rectangular cross-section shape, by layers of glue, indicated at 60 and 61, to a plate 62 which overlies plate 29 and is secured to the handle base plate 13 together with plate 29 by means of the screw bolts 30 heretofore described.

Mounted upon the plate 62 are a pair of standards 63 and 64 which are formed with a vertical passageway 65 bounded by parallel side walls 66 and 67.

The bristle holder 19 is adapted to move vertically from the plate 62 in the passageway 65, as clearly shown in Fig. 7. This bristle holder is urged outwardly by a spring 68. This spring 68, as shown in Fig. 7, is a compressed coil spring which pushes the holder 19 outwardly until its edges engage lips 69 and 70 on the upper ends of the walls 66 and 67. In this position the bristles are yieldingly pushed outwardly beyond surfaces 18 and 26 of the synthetic sponge rubber members 14' and 22'' as indicated at 21 in Figs. 7 and 8.

In Fig. 8 is shown a double strap spring 71 secured to plates 62 and 29 and handle plate 13 by the screw bolt 30. This spring member is formed with curved ends 71' and 72 which engage the bottom wall of bristle carrier 19 at points between the standards 63 and 64. The spring arms are held and guided on the said bottom wall of the bristle carrier by means of headed members 73 and 74, which extend through slots 75 and 76 in said spring members as shown in Fig. 8.

When coil springs are used they are located within the passageways 65a in uprights 63 and 64, as indicated in dotted lines in Fig. 8. But it will be understood that the two forms of springs shown respectively in full lines in Figs. 7 and 8 are not to be employed together.

In this form, as shown in Figs. 7 and 8, when the synthetic sponge rubber members have been charged with liquid they will be drawn back and forth over any glass member, such as a windshield of an automobile. The stiff bristles carried by the slidable holder 19 will contact the surfaces of the glass, but will be pushed back against the force of either springs 68 or springs 71, thus being held against the surface of the glass with a yielding spring pressure. Thus, at the same time the sponge rubber members are moistening the surface and being rubbed over it, the row of bristles, under spring pressure will, engage with their ends and remove all adherent particles of matter, such as the mucilaginous remains from insect parts and the like.

The plate 29 has an angularly turned portion 31 which carries a spring steel plate 32 of the same length as, or slightly longer than the liquid absorber members 14 and 22. This plate portion adjacent its outer edge is provided with a multiplicity of perforations or holes 33 (see Fig. 4). A plastic squeegee member 35 is cast directly upon the outer edge 36 of the spring plate 32. This squeegee member may be a kind of plastic material such as synthetic rubber, or other types of plastic material, so long as it has a slightly yielding texture.

As shown in Figs. 1, 7 and 8, the squeegee member 35 is extended at 37 and 38 slightly beyond the end of plate 32, and these extended portions are provided with wedge-shaped thickened parts 39 and 40, Figs. 3 and 4, which are sloped inwardly as shown in Fig. 3.

These thickened sloping portions have the effect, as the squeegee is pulled over the glass surface, of gathering and moving the liquid toward the center, and thus preventing liquid from flowing over the ends of the squeegee, so as to make a clean polishing of the glass surface for the full width of the squeegee without any water streaks.

As shown in Fig. 5, when the water absorbent device of the form of Figs. 1 and 2 is pressed downwardly upon the glass surface 41 to bring the greater part of surface 18 of member 14 and surface 26 of member 22 into the plane of the surface of the glass, the members 14 and 22 will be pushed upwardly, as indicated at 42 and 43, by the action of the extended part 21 of the row of bristles 20. This will bow the surfaces 18 and 26 inwardly at a point where they come against the bristles, as indicated at 44, and the bristles will in effect be spring-held against the glass surface 41, to exert pressure upon those surfaces in excess of the pressure applied to the other parts of surfaces 18 and 26.

When in this position, or that heretofore described for the form of Figs. 7 and 8, the entire apparatus can be wiped smoothly back and forth over the glass surface 41 and it will quickly and completely remove all adherent material from the glass surface, whereupon the handle 10 may immediately be turned and the corner edge 45 of the elongated squeegee will be applied to the moist glass surface for removal of liqiud and detergent solution and final polishing of the windshield glass.

The windshield cleaner will operate best with some detergent solution, as for example, a very thin solution of soap, or some non-saponaceous detergent chemical. Means must be provided for permitting absorption of a sufficient amount of said solution without excess. Such means I have shown in Fig. 6.

Figure 6:
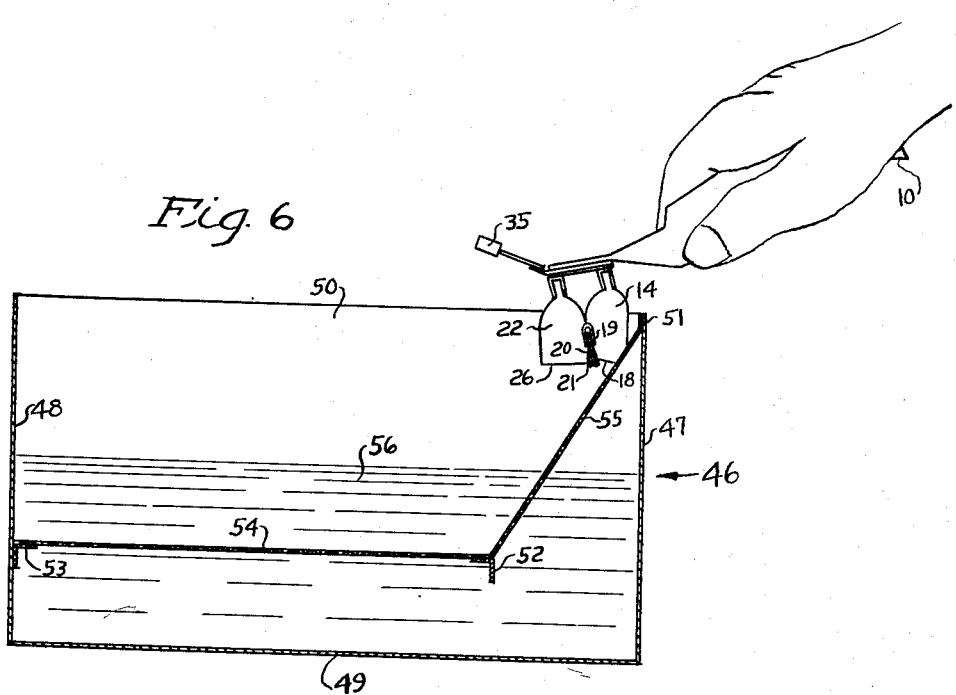
Fig. 6 is a cross-sectional view showing the detergent container in the manner in which the sponge rubber members obtain the detergent from the container and withdraw excess detergent therefrom.

As there indicated, a container 46, preferably rectangular in cross-section and open at the top, is provided with end walls 47 and 48, a bottom wall 49, and side walls such as shown at 50 in Fig. 6.

Upon transverse supports 52 and 53 is rested a horizontal screen 54, preferably of fairly coarse mesh, which at the same time will prevent the absorbent members 14 and 22 of the cleaner from going to the bottom 49, and yet will permit all particles of grit and dirt to pass through the screen and into the lower part of the detergent solution.

Extending between support 52 and the upper edge 51 of the end wall 47 in an angular direction, is a second screen member 55, which may be made of finer mesh and somewhat more resistant to pressure.

To charge the cleaner, it is dipped into the solution below the surface 56 thereof, and to the screen 54, where it is allowed to absorb a full charge of liquid. It is then pressed, as shown, against the upper edge 51 of end wall 49 and in part against screen 55, first from one side and then from the other, thereby squeezing out surplus solution and preparing the device for use in cleaning the windshield.

The advantages of my invention have been made to appear quite fully in the foregoing specification. Briefly stated, these advantages consist in the provision of a unitary member which is capable at the same time of applying the cleaning solution to the surface of the windshield glass, effecting a rubbing or wiping action by using the material of the synthetic sponge-rubber water absorber in a rubbing and cleaning action, pressing the bristles against the surface of the plate by a yielding or spring action for complete removal of strongly adherent material, and finally removing moisture and polishing the windshield. This will result not only in much faster operation and more complete cleaning, but in far better cleaning than is accomplished at the present time, and in the saving of time of motorists who, at filling stations where such cleaning customarily takes place, are not forced to wait very considerable periods of time while their windshield is being cleaned.

I claim:

1. A windshield cleaner, comprising a supporting member, a pair of compressible liquid absorbing members rigidly supported in side-by-side relationship on said supporting member, said absorbing members each having an outer contacting surface for rubbing a windshield, and a row of relatively short stiff bristles extending between the adjacent surfaces of said absorbing members, said bristles having their outer ends extending beyond the outer contacting surfaces of said absorbing members and their inner ends resiliently supported between the outer contacting surfaces of the absorbing members and the supporting member and in spaced relation thereto to permit relative movement between the bristles and a portion of the outer surfaces of the absorbing members when pressure is applied to the outer ends of the bristles.

2. A windshield cleaner, comprising a support, a substantially rectangular block of resilient compressible liquid absorbing material secured on one face to said support and being effective to convey liquid for application by an opposite face to a surface to be cleaned, a row of relatively stiff bristles extending along one lateral side of said block with their outer ends projecting beyond the plane of the outer face of the block, the length of the bristles forming said row being less than the distance between the opposite faces of said block, and a U-shaped clamping member enclosing the inner ends of the bristles, said clamping member being united to the side of the block between its opposite faces to permit retraction of the outer ends of the bristles through the resilience of the block when pressure is applied to the outer ends of the bristles.

3. A window cleaner, comprising a support, a pair of substantially rectangular blocks of resilient compressible liquid absorbing material secured in side-by-side relation to each other to said support to provide contiguous outer faces, said blocks being effective to convey liquid to a surface to be cleaned, a row of relatively short bristles positioned between the adjacent side surfaces of said blocks, said bristles having their outer ends extending beyond the outer faces of the blocks and their inner ends terminating in spaced relation to the support, a U-shaped member enclosing the inner ends of said bristles, and spring means connecting said U-shaped member and the support for yieldably holding the outer ends of said bristles beyond the outer faces of said blocks.

4. A window cleaner, comprising a support, a pair of substantially rectangular blocks of resilient compressible liquid absorbing material having outer and inner faces secured in side-by-side relation to each other on their inner faces to said support to provide contiguous outer faces, said blocks being effective to convey liquid to a surface to be cleaned, and a row of relatively short bristles positioned between adjacent side walls of said blocks, the outer ends of said bristles extending beyond the plane of the contiguous outer faces of said blocks, the inner ends of said bristles terminating in spaced relation to the inner faces of said blocks and supported by the side wall of at least one of said blocks in spaced relation to the support and in such a manner to permit retraction of the row of bristles between the blocks by the resilience of at least one of the blocks.

5. A windshield cleaner, comprising a supporting member, a pair of compressible liquid absorbing members supported in laterally spaced relationship to each other on said supporting member, said absorbing members each having an outer contacting surface for rubbing a windshield and parallel adjacent side surfaces, a row of relatively short stiff bristles extending between the adjacent side surfaces of said absorbing members, said bristles having their outer ends extending beyond the outer contacting surfaces of said absorbing members and their inner ends terminating in spaced relationship to the supporting member, and a U-shaped member embracing the inner ends of the row of bristles and having its outer lateral surfaces secured to the side surfaces of the absorbing members adjacent the contacting surfaces of the absorbing members and in spaced relation to the supporting member to permit relative movement between the bristles and a portion of the outer surfaces of the absorbing members when pressure is applied to the outer ends of the bristles.

6. A windshield cleaner, comprising a supporting member, a pair of compressible liquid absorbing members supported in laterally spaced relationship to each other on said supporting member, said absorbing members each having an outer contacting surface for rubbing a windshield and parallel adjacent side surfaces, a row of relatively short stiff bristles extending between the adjacent side surfaces of said absorbing members, said bristles having their outer ends extending beyond the outer contacting surfaces of said absorbing members and their inner ends terminating in spaced relationship to the supporting member, a U-shaped member embracing the inner ends of the row of bristles between the adjacent sides of the absorbing members, and resilient means connected between said U-shaped member and the supporting member to permit relative movement between the bristles and the outer surfaces of the absorbing members when pressure is applied to the outer ends of the bristles.

7. A windshield cleaner, comprising a supporting member, a pair of compressible liquid absorbing members rigidly supported in side-by-side relationship on said supporting member, said absorbing members each having an outer contacting surface for engaging a windshield and adjacent side surfaces, and a row of relatively short stiff bristles extending between the adjacent side surfaces of said absorbing members, said bristles having their outer ends extending beyond the outer contacting surfaces of the absorbing members and their inner ends resiliently carried by the supporting member between the outer contacting surfaces of the absorbing members and the supporting member and in spaced relationship thereto to permit relative movement between the bristles and the outer contacting surfaces of the absorbing members when pressure is applied to the outer ends of the bristles.

ELMER A. FUGLIE.

References Cited in the file of this patent

UNITED STATES PATENTS

| Number | Name | Date |
|---|---|---|
| 603,581 | Urmston | May 3, 1898 |
| 1,135,616 | Reller | Apr. 13, 1915 |
| 1,535,304 | Gerdin | Apr. 28, 1925 |
| 1,778,121 | Paull | Oct. 14, 1930 |
| 1,818,917 | Wolf | Aug. 14, 1931 |
| 1,942,205 | Elnett | Jan. 2, 1934 |
| 1,994,939 | Boulton | Mar. 19, 1935 |
| 2,104,161 | Koukal | Jan. 4, 1938 |
| 2,165,508 | Rieber | July 11, 1939 |
| 2,186,055 | Vaughn | Jan. 9, 1940 |
| 2,207,582 | Dunbar | July 9, 1940 |
| 2,227,635 | Dean | Jan. 7, 1941 |
| 2,296,949 | Roberto | Sept. 29, 1942 |
| 2,303,759 | Pippin | Dec. 1, 1942 |
| 2,304,961 | Schulman | Dec. 15, 1942 |
| 2,518,765 | Ecker | Aug. 15, 1950 |

FOREIGN PATENTS

| Number | Country | Date |
|---|---|---|
| 207,195 | Switzerland | Jan. 16, 1940 |
| 490,174 | Great Britain | Aug. 10, 1938 |